June 26, 1951 G. S. P. FREEMAN 2,558,647

STORAGE ELECTRODE TYPE CATHODE-RAY TUBE

Filed Nov. 5, 1948

INVENTOR
G. S. P. FREEMAN
BY
Paul Kolisch
ATTORNEY

Patented June 26, 1951

2,558,647

UNITED STATES PATENT OFFICE 2,558,647

STORAGE ELECTRODE TYPE CATHODE-RAY TUBE

George Stanley Percival Freeman, London, England, assignor to Cinema-Television Limited, London, England, a corporation of England Application November 5, 1948, Serial No. 58,486
In Great Britain December 12, 1947

10 Claims. (Cl. 313—64)

The present invention comprises improvements in or relating to cathode ray tubes and is more particularly concerned with cathode ray tubes used for viewing television images and incorporating a target electrode which serves the purpose of electrically storing the image during the frame period so that each picture point on the fluorescent screen of the tube remains visible for a much longer time than it does when the screen is scanned directly by a modulated cathode ray beam.

Certain suggestions have already been made for constructing cathode ray tubes, for viewing television pictures, which embody the so-called storage principle but these tubes suffer from defects which impair the quality of the reconstituted picture and it is the object of the invention to provide a cathode ray tube for television which enables storage to be used so that the advantage of a reduced flicker effect is achieved while at the same time a picture of good quality is obtained.

According to the invention there is provided a cathode ray tube for viewing television images which comprises a target in the form of a storage electrode arranged to be scanned by an intensity modulated cathode ray beam and to control the intensity of elementary cross-sections of an electron stream incident on a fluorescent screen, and means for preventing secondary electrons released from said target as a result of the impingement of the scanning electrons from being redistributed over the target area.

According to a feature of the invention the storage electrode comprises a glass plate with low transverse resistance.

According to a further feature of the invention the means for preventing redistribution of secondaries over the target comprises a solenoid producing a magnetic field axially along the tube.

According to a still further feature of the invention an electrode for collecting secondaries emitted by the target is disposed in close proximity to the latter.

According to another feature of the invention the target on the side thereof remote from the scanning beam is provided with a conducting mesh coated with photo-emissive material.

It is to be understood that the expression storage electrode, in addition to referring to thin glass electrodes such as used in certain types of television transmitting tubes, is intended to include all kinds of double sided mosaic electrodes in which a charge on an element on one side of the electrode is effective in bringing about a conducted controlling effect on the other side of the electrode.

Various advantages of a cathode ray tube manufactured in accordance with the present invention will be evident from the following description which should be read in conjunction with the drawings, in which.

Figure 1:
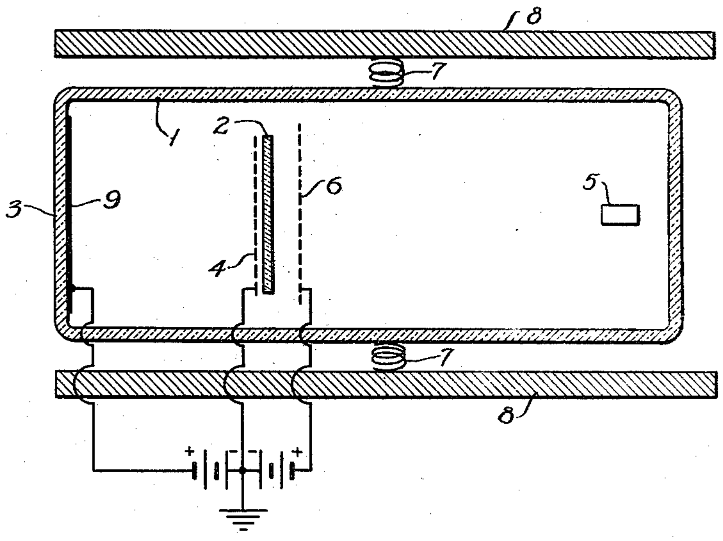
Fig. 1 shows a schematic view of the invention.
Figure 2:
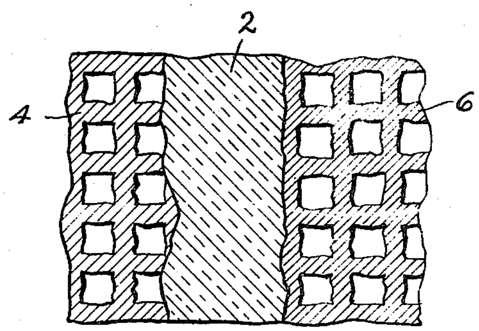
Fig. 2 shows an end view of the three electrodes, each of which is partially cut away.

Referring now to the drawing,

A cathode ray tube comprises a glass envelope 1 which houses a target in the form of a storage electrode 2 consisting of a very thin glass plate with low transverse resistance of the kind used in television transmitting tubes known as image orthicons. On the side of the electrode 2 facing the viewing window 3 of the tube there is provided a conducting mesh 4 coated with photo-emissive material and in contact with the electrode 2; this mesh is shown more clearly in Figure 2. The conducting mesh 4, instead of being in contact with the electrode 2, can alternatively be disposed in close proximity thereto. The viewing window 3 is covered on its inner face with a metal backed screen of fluorescent material 9 having a short decay time. The electrode 2 is scanned on its side remote from the viewing window 3 by a cathode ray beam emanating from a gun 5, comprising accelerating electrodes and a control electrode for intensity modulating the beam. A mesh electrode 6 for collecting secondary electrons released from the electrode 2 is disposed between the gun 5 and the electrode 2. For efficient operation it may prove desirable to place the mesh electrode 6 in close proximity to the electrode 2. Deflecting coils 7 are provided to deflect the scanning beam and surrounding the envelope 1 and the coils 7 there is provided an elongated solenoid 8, extending the whole length of the tube, which provides a magnetic field axially of the envelope 1. Instead of the deflecting coils 7 the glass envelope may house electrically deflecting means positioned between gun 5 and electrode 6.

The cathode ray tube operates in the following manner:

The cathode ray beam, which scans the target 2, is accelerated by the accelerating electrodes so that several secondary electrons per primary are produced when it impinges on the target. The beam is intensity modulated with the picture signal, and will in consequence build up a charge image on the target 2. This charge is positive with respect to mesh 6, the local amplitude of the charge depending on the instantaneous intensity of the beam when traversing any given point of the target. Redistribution of secondaries released by the beam will be prevented by the field produced by the solenoid 8 in cooperation with an electrical field set up between mesh 4 and electrode 6 which will cause the secondary electrons to move towards electrode 6 in helical paths of small radius, the axes of the helices being parallel to the said magnetic field, and, as a result, the charge image will be maintained with its original distribution. Picture black will be represented by a definite beam value and hence by a definite picture point potential which is positive with respect to mesh 6.

An electric field is set up between the photocathode mesh and the fluorescent screen 3. The magnetic field produced by the solenoid 8 in cooperation with the electric field accelerates the photoelectrons away in helical paths whose axes are parallel to the magnetic field. The electric field and the magnetic field are adjusted so as to cause the photoelectrons to impact the fluorescent screen in focus.

Now if the mesh 4 is illuminated by a light source (not shown), the point to point photoemission will be controlled by the charges on the glass area of the target 2. The photocathode mesh 4 is biased to a potential of such a value that photo-emission is suppressed by the charges on the clear glass areas of the target 2 corresponding to picture black.

The other charges having higher positive values will cause photoelectrons to flow to the fluorescent screen and the point to point intensity of the photoelectron stream will correspond to the point to point charges on the glass area. The solenoid field in cooperation with the electric field between mesh 4 and screen 3 will prevent anything but very slow neutralization of the charged glass areas by the photoelectrons so that the photo-emission will remain fairly constant during one frame period.

When the next scanning cycle takes place the clear areas of the target will readjust themselves to the new intensity of the scanning beam and will then maintain a new constant photoemission for each individual picture point over another frame period.

It will thus be seen that the intensity of illumination of any given point on the fluorescent screen will remain substantially constant for a frame period so that flicker is greatly reduced.

Calculation shows that with the known photosensitivities obtainable at the mesh cathode 4 and with the maximum tolerable illumination of this mesh and taking into account the increased efficiency of the fluorescent powder at low current density, a tube constructed in accordance with the invention would produce in a 30 frames per second system about one half the light energy from the fluorescent screen per picture point per frame as it is possible to obtain in certain cathode ray tubes used for the projection of large images where the screen is scanned directly by the modulated cathode ray beam. This limitation is set by the use of a photocathode instead of a thermionic one as the electron source.

The invention is however particularly suitable for cathode ray tubes used in the projection of television pictures on small screens and for tubes used for the direct viewing of television pictures where it is advantageous to obtain a picture of good quality free from flicker effects.

What is claimed is:

1. A cathode ray tube for viewing television images comprising an intensity modulated cathode ray beam, means for scanning the beam, a fluorescent screen, a two-sided storage electrode having an insulator forming a target area arranged to be scanned by the cathode ray beam and a photosensitive element forming a photoemissive area facing the fluorescent screen and means for collecting all the secondary electrons released from said target area as a result of the impingement of the electrons of the scanning beam whereby the point-to-point intensity of the photoelectric stream emanating from the photo-emissive area corresponds to the point-to-point intensity of the scanning cathode ray beam.

2. A cathode ray tube for viewing television images comprising an intensity modulated cathode ray beam, means for scanning the beam, a fluorescent screen, a two sided storage electrode having an insulator forming a target area arranged to be scanned by the cathode ray beam and a photosensitive element forming a photoemissive area facing the fluorescent screen, a solenoid producing a magnetic field axially along the tube, and a collecting electrode whereby the intensity of elementary cross sections of the photoelectric stream incident on the fluorescent screen emanating from said photo-emissive area is controlled by the charges of the target area produced by the secondary electrons emanating from said target area.

3. The cathode ray tube according to claim 2, and in which the solenoid is elongated in a direction parallel to the axis of the tube.

4. The cathode ray tube as in claim 2, and in which the insulator is a glass plate with low transverse resistance.

5. The cathode ray tube as in claim 2, and in which the collecting electrode is disposed in close proximity to the target area.

6. The cathode ray tube according to claim 2, and in which the photosensitive element comprises a conducting mesh coated with photo-emissive material.

7. The cathode ray tube according to claim 6, and in which the conducting mesh is in contact with the insulator of the storage electrode.

8. The cathode ray tube according to claim 6, and in which the conducting mesh is disposed in close proximity to the insulator of the storage electrode.

9. The cathode ray tube according to claim 6, and in which the conducting mesh has a potential such that the charges on the target area corresponding to picture black suppress photo-emission emanating from the photosensitive area to the fluorescent screen.

10. A cathode ray tube for viewing television images comprising an intensity modulated cathode ray beam, means for scanning the beam, a fluorescent screen, a two-sided storage electrode having a glass plate with low transverse resistance forming a target area arranged to be scanned by the cathode ray beam and a conducting mesh coated with photosensitive material forming a photoemissive area facing the fluorescent screen, a solenoid producing a magnetic field axially along the tube and a collecting electrode disposed in close proximity to the target area for collecting all the secondary electrons released from said target area as a result of the impingement of the electrons of the scanning beam whereby the intensity of elementary cross sections of an electron stream incident on the fluorescent screen emanating from the photo-emissive area of the storage electrode is controlled by the charges of the target area produced by the secondary electrons emanating from said target area the potential of the conducting mesh being such that the charges on the target area corresponding to picture black suppress photo-emission from the photo-emissive area to the fluorescent screen.

GEORGE STANLEY PERCIVAL FREEMAN.

REFERENCES CITED

The following references are of record in the file of this patent:

UNITED STATES PATENTS

| Number | Name | Date |
|---|---|---|
| 2,133,123 | Tihanyi | Oct. 11, 1938 |
| 2,157,048 | Zworykin | May 2, 1939 |
| 2,212,249 | Schroter | Aug. 20, 1940 |
| 2,213,070 | Farnsworth | Aug. 27, 1940 |
| 2,214,973 | Rose | Sept. 17, 1940 |
| 2,240,186 | Iams | Apr. 29, 1941 |
| 2,250,721 | Moller et al. | July 29, 1941 |
| 2,324,504 | Iams et al. | July 20, 1943 |
| 2,403,239 | Rose | July 2, 1946 |
| 2,460,093 | Law | Jan. 25, 1949 |